United States Patent [19]
McGaffigan

[11] Patent Number: 5,481,799
[45] Date of Patent: Jan. 9, 1996

[54] PROCESS FOR PRODUCING A SELF-HEATING AUTO REGULATING CONNECTOR

[75] Inventor: Thomas H. McGaffigan, Half Moon Bay, Calif.

[73] Assignee: Metcal, Inc., Menlo Park, Calif.

[21] Appl. No.: 226,320

[22] Filed: Apr. 12, 1994

Related U.S. Application Data

[62] Division of Ser. No. 14,164, Feb. 5, 1993, Pat. No. 5,319, 173, which is a division of Ser. No. 404,621, Sep. 8, 1989, Pat. No. 5,208,443, which is a continuation-in-part of Ser. No. 242,208, Sep. 9, 1988, abandoned.

[51] Int. Cl.$^6$ ................................................ H01R 43/02
[52] U.S. Cl. ................... 29/879; 156/272.4; 219/505; 219/634; 219/660
[58] Field of Search .................... 29/879; 219/634, 219/13, 635, 660, 505; 156/272.4

[56] References Cited

U.S. PATENT DOCUMENTS

| | | |
|---|---|---|
| 1,975,436 | 10/1934 | Sorrell . |
| 1,975,437 | 10/1934 | Sorrell . |
| 2,393,541 | 1/1946 | Kohler . |
| 3,191,132 | 6/1965 | Mayer . |
| 3,309,633 | 3/1967 | Mayer . |
| 3,391,846 | 7/1968 | White . |
| 3,451,609 | 6/1969 | Gillett . |
| 3,461,074 | 8/1969 | James . |
| 3,470,046 | 9/1969 | Verdin . |
| 3,510,619 | 5/1970 | Leatherman . |
| 3,528,867 | 9/1970 | Leatherman et al. . |
| 3,548,140 | 12/1970 | O'Neill . |
| 3,551,223 | 12/1970 | Deal et al. . |
| 3,574,031 | 4/1971 | Heller, Jr. et al. . |
| 3,652,361 | 3/1972 | Leatherman . |
| 3,709,775 | 1/1973 | James . |
| 3,802,985 | 4/1974 | Leatherman . |
| 3,902,940 | 9/1975 | Heller, Jr. et al. . |
| 3,911,552 | 11/1975 | Trimble et al. . |
| 3,923,580 | 12/1975 | Leatherman . |
| 3,933,536 | 1/1976 | Doser et al. . |
| 3,941,641 | 3/1976 | Heller, Jr. et al. . |
| 3,945,867 | 3/1976 | Heller, Jr. et al. . |
| 4,029,837 | 6/1977 | Leatherman . |
| 4,035,547 | 7/1977 | Heller, Jr. et al. . |
| 4,107,506 | 8/1978 | Pelégri . |
| 4,223,209 | 9/1980 | Diaz . |
| 4,228,761 | 10/1980 | Glover et al. . |
| 4,256,945 | 3/1981 | Carter et al. . |
| 4,347,487 | 8/1982 | Martin . |

(List continued on next page.)

FOREIGN PATENT DOCUMENTS

| | | |
|---|---|---|
| 39-21711 | 4/1964 | Japan . |
| 39-21967 | 4/1964 | Japan . |
| 1076772 | 7/1967 | United Kingdom . |

OTHER PUBLICATIONS

Defensive Publication; Day; T905,001, Published Dec. 19, 1972.

*Primary Examiner*—Carl J. Arbes
*Attorney, Agent, or Firm*—Burns, Doane, Swecker & Mathis

[57] ABSTRACT

This invention relates to heat-recoverable devices that are self-heating and auto-regulating. The heat-recoverable articles of this invention comprise the combination of a heat-recoverable material and lossy heating particles, such as ferromanetic or ferrimagnetic particles, which produce heat when subjected to an alternating magnetic field and have a Curie temperature at or above the recovery temperature of the material and preferably below the decomposition temperature of the material. The particles can be in an electrically non-conductive layer, on or in thermal contact with the heat-recoverable material or can be dispersed in the heat-recoverable material. The system of this invention includes the heat-recoverable device or article, an induction coil for producing the magnetic field and an alternating current power supply for the induction coil. Preferably the power supply is high frequency and constant current, which produces efficient heating and preferred auto-regulating properties. Preferred particles are small particle size ferrites.

3 Claims, 2 Drawing Sheets

U.S. PATENT DOCUMENTS

| | | |
|---|---|---|
| 4,428,790 | 1/1984 | Diaz . |
| 4,450,023 | 5/1984 | DeBlauwe . |
| 4,486,721 | 12/1984 | Cornelius et al. . |
| 4,499,438 | 2/1985 | Cornelius et al. . |
| 4,555,422 | 11/1985 | Nakamura et al. . |
| 4,632,866 | 12/1986 | Kubota et al. . |
| 4,654,511 | 3/1987 | Horsma et al. . |
| 4,659,912 | 4/1987 | Derbyshire . |
| 4,675,512 | 6/1987 | Doucet et al. . |
| 4,695,712 | 9/1987 | Busch . |
| 4,695,713 | 9/1987 | Krumme . |
| 4,699,743 | 10/1987 | Nakamura et al. . |
| 4,717,814 | 1/1988 | Krumme . |
| 4,789,767 | 12/1988 | Doljack . |
| 4,814,546 | 3/1989 | Whitney et al. . |
| 4,814,587 | 3/1989 | Carter . |
| 4,862,088 | 8/1989 | Etienne et al. . |
| 4,914,267 | 4/1990 | Derbyshire . |
| 4,987,394 | 1/1991 | Harman et al. . |
| 5,053,595 | 10/1991 | Derbyshire . |
| 5,087,804 | 2/1992 | McGaffigan . |
| 5,093,545 | 3/1992 | McGaffigan . |
| 5,126,521 | 6/1992 | McGaffigan . |
| 5,208,443 | 5/1993 | McGaffigan . |
| 5,319,173 | 6/1994 | McGaffigan . |

PROCESS FOR PRODUCING A SELF-HEATING AUTO REGULATING CONNECTOR

RELATED APPLICATION

This application is a division of U.S. patent application Ser. No. 08/014,164 filed Feb. 5, 1993, now U.S. Pat. No. 5,319,173, which is a division of U.S. patent application Ser. No. 07/404,621, filed Sep. 8, 1989, now U.S. Pat. No. 5,208,443 which is a continuation-in-part of U.S. patent application Ser. No. 07/242,208 filed Sep. 9, 1988, now abandoned.

FIELD OF THE INVENTION

This invention relates to heat-recoverable articles, sleeves, and connectors and more particularly relates to the temperature auto-regulated devices and methods providing proper heating for recovery of such heat-recoverable articles.

BACKGROUND OF THE INVENTION

The prior art relating to heat-recoverable articles illustrates many different means to effect heating and thereby to recover heat-recoverable articles. These means include hot air, infrared radiation, ultrasonic vibration, chemical exotherm, open flame, and electrical resistance heating. All of these methods suffer from various disadvantages, one of which is insufficient control which either leads to overheated and/or excess temperature conditions which damage the heat-recoverable material, or to under-heated and/or insufficient temperature conditions which result in insufficient recovery of the heat-recoverable article. Other problems occur when the correct temperature is achieved, but the temperature is not maintained at the required level for a sufficient period of time to allow complete or desired recovery of the heat-recoverable article. In one regard, it can be seen that the prior art devices and methods are very energy-inefficient, particularly those in which heat is supplied from an outside source to the outside surfaces of the heat-recoverable article, thereby causing a significant waste of heat and energy. This also limits the applicability of the prior art devices and methods.

Additional problems occur due to non-uniform heating of the mass of the recoverable material in the heat-recoverable article. Thus, in heat-recoverable articles in which the heat-recoverable material is of an even thickness or even mass distribution, the problem has been to obtain uniform or even heating of the heat-recoverable material to assure uniform recovery. In other articles wherein the thickness or mass of the heat-recoverable material differs in various parts of the heat-recoverable article, the problem has been to obtain appropriate heat distribution and sufficient heating in each of the various areas of different thickness or different mass in order to achieve sufficient recovery of the higher mass areas without overheating the areas of lower mass.

Various devices and methods have been attempted in order to auto-regulate or enable an operator to control the heating of heat-recoverable articles. For example, in Glover et al., U.S. Pat. No. 4,228,761, and in DeBlauwe, U.S. Pat. No. 4,450,023, thermochromic coatings are disclosed for visual indicators showing the desired temperature of the article has been attained for sufficient recovery and heating of other materials and components present. However, it should be noted that such indicators provide no means of control or regulation of the heating, but merely provide a visual indication to an operator who can, in turn, control the heating, such as by stopping the application of heat.

Various other attempts have been made to provide a limited amount of heat or to provide self-regulating heating means for heat-recoverable articles. In Deal et al., U.S. Pat. No. 3,551,223, a pyrotechnic coating is disclosed for supplying a specified amount of heat to heat-recoverable articles. In Diaz, U.S. Pat. No. 4,223,209, and Horsma, et al., U.S. Pat. No. 4,654,511, self-regulating conductive polymer heating devices are disclosed for use with heat-recoverable articles.

These and other devices and methods for providing controllable or self-regulating, properly proportioned heating for heat-recoverable articles have not produced satisfactory results for a number of reasons. A primary cause of the problems and difficulties in achieving the proper or desired control of temperature and the desired proportioning of heating is due to the fact that as the heat-recoverable article recovers, the shape, dimensions, geometry, thickness, and other physical characteristics of the heat-recoverable article change drastically—and in many cases change non-uniformly over the different parts and areas of the heat-recoverable article.

In addition, the geometric problems are further complicated by the fact that the geometry is constantly changing while the recovery of the article is occurring. Consequently, the thermochromic coating indicators are frequently inadequate to indicate whether the desired temperature or heating has been achieved in particular areas of the article. In thick walled atricles the thermochromic coating only indicates the surface temperature and does not indicate the internal temperature of the article. Also, erroneous or inadequate indications are given when hot air or open flame is used, because the coating is heated first Similarly, the changing geometry and configuration of heat-recoverable articles as they recover results in various complications and problems associated with the use of the above-mentioned self-regulating conductive polymer heating elements.

A number of the above disadvantages have been overcome by Derbyshire. As disclosed by Derbyshire in copending U.S. patent application Ser. No. 445,819 filed Dec. 1, 1982, now abandoned and corresponding to U.S. Pat. No. 5,053,959 to PCT International Publication WO84/02098 Application No. PCT/US83/01851), it has been found to be advantageous to use Curie temperature limited heating for various heat-recoverable articles. Derbyshire discloses the use of ferromagnetic materials having the desired Curie temperature in electrically conductive layers to provide auto-regulated heating to the Curie temperature of the material upon application of an alternating current to the conductive layer of ferromagnetic material. The power applied to the ferromagnetic layer is in the form of an alternating current source which produces skin effect or eddy current heating in the continuous ferromagnetic layer. As the ferromagnetic layer reaches the Curie temperature, the permeability of the layer drops and the skin depth increases, thereby spreading the current through the wider area of the ferromagnetic layer until the Curie temperature is achieved throughout and the desired heating is achieved. The alternating current is supplied to the ferromagnetic layer either directly from a power source through electrodes in the conductive layer of ferromagnetic material or is supplied inductively from an adjacent insulated conductive layer directly powered with the alternating current.

While the Derbyshire type of Curie temperature limited heating of heat-recoverable materials and articles provides certain advantages and improvements over other prior art, the Derbyshire skin effect or eddy current heating has one aspect which is a disadvantage in many applications. The disadvantage is due to the necessity of their being electrically conductive layers in the heat-recoverable articles. In many applications, it is desirable to have no electrically conductive layers or areas in the heat-recoverable article.

The disclosures of the above references are incorporated herein by reference.

In view of the insufficiencies and certain disadvantages of the above prior art devices and articles, it is apparent that there is a need for improved auto-regulating, heat-recoverable articles. The present invention has been developed to provide auto-regulating, heat-recoverable articles as well as systems for using those articles which do not suffer from the insufficiencies or disadvantages mentioned above.

Therefore, it is an object of this invention to provide heat-recoverable articles which do not require hot air, infrared radiation, ultrasonic vibration, flame, or D.C. resistance heating to effect recovery.

It is a further object of this invention to provide heat-recoverable articles which are auto-regulating and thereby are protected from overheating.

It is a further object of this invention to provide heat-recoverable articles which can be electrically non-conductive in their entirety or in any desired portion thereof.

It is another object of this invention to provide heat-recoverable articles which are capable of minimizing the energy requirements necessary for recovery.

It is another object of this invention to provide improved Curie temperature limited heating for heat-recoverable articles by eliminating the need for direct electrical connection to the heat-recoverable article.

It is another object of this invention to permit easy selection of precise Curie temperature limited heatable articles and to tailor the Curie temperature to particular needs without concern for incorporating electrically conductive layers or electrical connections in the article.

It is another object of this invention to provide an improved self-heating soldering device incorporating a self-heating, heat-recoverable sleeve with a solder preform located inside the sleeve.

It is another object of this invention to provide an improved heat-recoverable article incorporating a fusing material, such as solder, or a thermoplastic material within a tubular member which is auto-regulating at a Curie transition temperature which is above the activation temperature of the fusing material, above the recovery temperature of the heat-recoverable material, and is below the degradation temperature of those materials.

These and other objects are achieved by the present invention as will be recognized by one skilled in the art from the following summary and description of this invention.

SUMMARY OF THE INVENTION

In one aspect, this invention is a self-heating, heat-recoverable article for use in an alternating magnetic field, comprising:

a) a layer of heat-recoverable material having a recovery temperature T, and b) an electrically non-conductive layer of lossy heating particles having a Curie temperature of T or greater whereby said particles are capable of producing heat when subjected to an alternating magnetic field, said layer of particles being in thermal contact with said layer and thereby being capable of heating said material to at least a temperature of T upon the article being subjected to said alternating magnetic field.

In another aspect, this invention is a self-heating, heat-recoverable article for use in an alternating magnetic field, comprising:

a layer of heat-recoverable material having a recovery temperature T and having dispersed in said material lossy heating particles having a Curie temperature of T or greater, whereby said particles are capable of heating said material to at least a temperature of T upon being subjected to an alternating magnetic field, and wherein said particles are arranged in said material such that the particles do not provide an electrically conductive path in said material.

In another aspect, this invention is a method of providing a self-heating, heat-recoverable article for use in an alternating magnetic field comprising:

applying an electrically non-conductive layer of lossy heating particles having a Curie temperature of T or greater to a surface of a heat-recoverable article having a recovery temperature T.

In another aspect, this invention is a method of providing a self-heating, heat-recoverable article comprising:

incorporating into a heat-recoverable material having a recovery temperature T an effective amount of lossy heating particles which have a Curie temperature of T or greater such that said particles do not provide an electrically conductive path in said material; and forming a heat-recoverable article.

In another aspect, this invention is a method of protecting a substrate comprising:

placing over the substrate a self-heating, heat-recoverable article comprising:

a) a layer of heat-recoverable material having a recovery temperature T, and b) an electrically non-conductive layer of lossy heating particles having a Curie temperature of T or greater whereby said particles are capable of producing heat when subjected to an alternating magnetic field, said layer of particles being in thermal contact with said layer and thereby being capable of heating said material to at least a temperature of T upon the article being subjected to said alternating magnetic field; and subjecting said article to an alternating magnetic field to effect recovery of the article onto the substrate.

In another aspect, this invention is a self-heating sleeve, comprising:

a) a layer of material deformed into a heat dimensionally unstable configuration, said material possessing a transition temperature T at which temperature it substantially recovers to its undeformed heat dimensionally stable configuration, and b) electrically non-conductive highly lossy ferromagnetic particles possessing a Curie temperature greater than T achievable upon exposure to an alternating magnetic field, said particles being in intimate contact with said layer.

In another aspect, this invention is a process for producing a self-heating, auto-regulating connector, comprising the steps of:

a) deforming a first dimensionally heat-stable sleeve to render the sleeve dimensionally heat-unstable at temperature T, b) coating the first sleeve with an electrically non-conductive layer of highly lossy, ferromagnetic particles having a Curie transition temperature greater than T, c) deforming a second dimensionally heat-stable sleeve to a dimensionally heat-unstable configuration at temperature T, d) positioning the second sleeve over the first sleeve so the coated particles are in contact with the second sleeve to form a composite sleeve, and e) exposing the combined sleeve to an alternating magnetic field causing the particles to heat to their Curie transition temperature which causes said first and second sleeves to substantially return to their dimensionally heat-stable configuration.

In another aspect, this invention is an auto-regulating system for recovering heat-recoverable articles comprising, in combination:

a self-heating, heat-recoverable article for use in an alternating magnetic field, comprising:

a) a layer of heat-recoverable material having a recovery temperature T, and b) an electrically non-conductive layer of lossy heating particles having a Curie temperature of T or greater whereby said particles are capable of producing heat when subjected to an alternating magnetic field, said layer of particles being in thermal contact with said layer and thereby being capable of heating said material to at least a temperature of T upon the article being subjected to said alternating magnetic field;

an induction coil adapted to produce said magnetic field; and a power supply being adapted to provide power to the induction coil as alternating current at a preselected frequency effective for heating said particles.

In another aspect, this invention is an assembly comprising:

an induction coil adapted to produce a magnetic field;

a self-heating, heat-recoverable article positioned in said magnetic field and comprising:

a) a layer of heat-recoverable material having a recovery temperature T, and b) an electrically non-conductive layer of lossy heating particles having a Curie temperature of T or greater whereby said particles are capable of producing heat when subjected to an alternating magnetic field, said layer of particles being in thermal contact with said layer and thereby being capable of heating said material to at least a temperature of T upon the article being subjected to said alternating magnetic field; and a power supply connected to said induction coil, said power supply being adapted to provide power to the induction coil as alternating current at a preselected frequency effective for heating said particles.

In preferred aspects, this invention provides the above articles, methods, systems and assemblies wherein the articles include connectors which contain fusible materials such as solder. In other preferred aspects, the power supply used in this invention is preferred to be a constant current power supply, which provides certain advantages with respect to the auto-regulation aspects of this invention.

DETAILED DESCRIPTION OF THE INVENTION

Figures 1, 2:
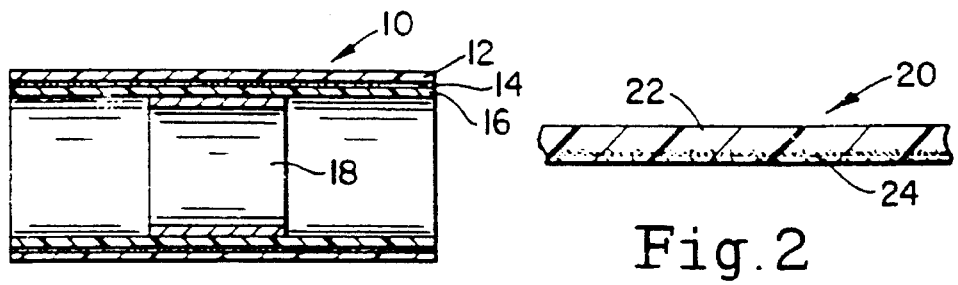
FIG. 1 is a cutaway side view of a heat-recoverable connector in accordance with this invention.
FIG. 2 is a cross-sectional view of a sheet made in conformity with this invention.

This invention is based at least in part on the realization and discovery that sufficient heat can be applied to heat-recoverable articles in an auto-regulated manner to efficiently recover the heat-recoverable article in a manner such that overheating and under-heating areas of the articles are avoided. This invention is also at least in part based upon the realization that the entire power and energy for recovering the heat-recoverable device can be provided by an external alternating magnetic field—without the need for applying external heat, without the need for supplying any electrical current to or through the heat-recoverable article itself, and without the need for the heat-recoverable article to contain any electrically conductive layers, areas, or contacts.

This invention comprises a particular combination of heat-recoverable material with "lossy heating particles" having a specific thermal and functional relationship with the heat-recoverable material. The lossy heating particles may be present in a layer on the surface of the heat-recoverable article or on the surface of the heat-recoverable material in the article, or may be dispersed in the heat-recoverable material or otherwise positioned in the atricle, as long as the heat from the lossy heating particles can effectively reach the heat-recoverable material. The "layer" of lossy heating particles may be present as particles dispersed in the heat-recoverable material or dispersed in another material layer adjacent to or in thermal contact with the heat-recoverable material. This particle layer is electrically non-conductive, due either to the arrangement of the particles or to the properties of the particles themselves. In this respect it is generally preferred to use electrically non-conductive ferrimagnetic particles and, more preferably, ferrite particles. Alternatively, if electrically conductive particles are used, they may be dispersed in or on the heat-recoverable material in such a fashion that the particles do not form electrically conductive pathways through or on the heat-recoverable material. Also, if it is desired to use electrically conductive particles, they can be coated with an electrically insulating layer or can be dispersed in a binder material which electrically insulates the articles from each other to prevent them from forming an electrically conductive pathway or layer.

The term "lossy heating particles" as used herein means any particle having particular properties which result in the particles being capable of generating sufficient heat for purposes of this invention when subjected to an alternating magnetic field having a specified frequency. Thus, any particle having these properties and being useful in the present invention is within the scope of this definition. As pointed out herein, there has been inconsistent and/or confusing terminology used in association with particles which respond to magnetic fields. While not being bound by particular terminology, the lossy heating particles useful in this invention generally fall into the two categories of particles known as ferromagnetic particles and ferrimagnetic particles.

In general, the ferrimagnetic particles, such as ferrites, are preferred because they are usually non-conductive particles and because they produce heat by hysteresis losses when subjected to an alternating magnetic field. Therefore, ferrimagnetic particles will produce heating by hysteresis losses in the appropriate alternating magnetic field, essentially regardless of whether the particle size is large or small.

Also useful in this invention, and preferred in some applications, are the ferromagnetic particles which are electrically conductive. Ferromagnetic particles will produce heating dominated by hysteresis losses if the particle size is small enough. However, since ferromagnetic particles are conductive, large particles will produce significant eddy current losses at the skin or surface thereof.

It is generally preferred in the practice of this invention to provide heating by hysteresis losses because, the particle size can be much smaller for effective hysteresis loss heating than for effective eddy current surface heating, i.e., for hysteresis loss heating, the smaller particle size enables more uniform heating of the article and does not degrade the mechanical properties of the material, because the smaller particles can be more dispersed than larger particles. The more dispersed, smaller particles thereby usually provide more efficient heating. However, the particle size is to be at least one magnetic domain in diameter in order to provide the necessary coupling with the alternating magnetic field, i.e., the particles are prefferably as small as practical but are multi-domain particles.

The heating produced by the lossy heating particles useful in the present invention can be either provided by or can be enhanced by coating the particles with an electrically-resistive coating. As will be recognized by one skilled in the art, particles that are not lossy because they do not exhibit hysteresis losses, can be converted to lossy heating particles for use in this invention by placing such a coating on the particles. The coating produces eddy current losses associated with the surface effect of the coated particles. At the same time, particles which are lossy due to hysteresis losses can be enhanced in their effectiveness for some applications by such coatings, thereby providing lossy particles which produce heating both by hysteresis losses and by eddy current losses.

Magnetic particles which are useful in the present invention are known in the art. For example, in White, U.S. Pat. No. 3,319,846, finely divided (0.01–5 micron), ferrite particles are suspended in or are coated on a selected heat-activatable material. The material may be in the form of a thermoplastic, hot-melt adhesives, etc. According to White, ferrite particles are exposed to a magnetic field of at least 10 megahertz, preferably 40 megahertz, in order to generate the inductive heating. The particles heat to a maximum temperature referred to as the "Neel" temperature. The Neel transition temperature of the particle (similar to the Curie temperature) is the point at which the magnetic field ceases to have an effect on the particles, and the temperature reaches a stable maximum. While White's disclosure describes a number of particles useful in the present invention, there are other particles useful in this invention.

Additionally, it is known that ferrites can possess any range of Curie temperatures by compounding them with zinc, manganese, cobalt, nickel, lithium, iron, or copper, as disclosed in two publications: "The Characteristics of Ferrite Cores with Low Curie Temperature and Their Application" by Murkami, IEEE Transactions on Magnetics, June 1965, page 96, etc., and Ferrites by Smit and Wijn, john Wiley & Son, 1959, page 156, etc.

There has been some inconsistent usage of terminology with respect to ferromagnetic particles in the past. For example, compare the nomenclature used in White referred to above and in Lee, Magnetism, an Introductory Survey, Dover Publications, Inc., New York, 1970, FIG. 44, at page 203. The preferred nomenclature is believed to be that of Lee and is primarily used herein. See also Brailsford, Magnetic Materials, Methuen & Co. Ltd., London, 1960.

The term "ferromagnetic" is frequently used to refer to magnetic particles generically regardless of their particular properties. Thus, ferrites have usually been referred to as being "ferromagnetic" or included in the general group of ferromagnetic materials. However, for purposes of this invention, it is preferred to use the terminology shown in FIG. 44 of Lee, referred to above, wherein the magnetic particles are classified in two groups, ferromagnetic and ferrimagnetic. The ferromagnetic particles are usually considered to be electrically conductive materials which have various magnetic properties. The ferrimagnetic particles are usually considered to be electrically non-conductive materials which also have various magnetic properties. Ferrites are usually considered to be electrically non-conductive materials and are thus in the class of ferrimagnetic materials. Both ferromagnetic materials and ferrimagnetic materials can be low-loss, or non-lossy, type of materials, which means they do not have significant energy loss or heat produced when subjected to an electric potential or magnetic field. These non-lossy type of magnetic materials are the kind used in various electric equipment components, such as ferrite cores for coils, where no or minimum energy loss/heat production is desired. However, both these materials can also be the high-loss, or lossy, type of materials, which means they will have significant energy loss and heat production when subjected to an electric potential or magnetic field. It is this class of lossy or highly lossy ferromagnetic and ferrimagnetic materials which are useful in the present invention.

Regardless of the labels or terminology for magnetic particles, the magnetic particles useful as and included within the scope of the term "lossy heating particles" for the present invention need merely to have the following properties: (1) having the desired Curie temperature for auto-regulation of the temperature when subjected to an appropriate alternating magnetic field, and (2) being sufficiently lossy, either by hysteresis losses, by eddy current losses, or both, in order to produce the desired heat when subjected to the alternating magnetic field. These particles are sometimes referred to as being "highly lossy." While the size of the particles is not particularly important in the present invention, it is desirable to use smaller particles since they can be dispersed more uniformly in the heat-recoverable material or article, thus heating more efficiently and uniformly. As recognized by one skilled in the art, the size of the particle should be no smaller than one magnetic domain, i.e., the particles should be multi-domain size particles.

As will also be recognized by one skilled in the art, the lossy heating particles, the magnetic induction coil, and the frequency, power and control mechanism for the power supply will all be selected for use in this invention so that they are matched for electrical properties and performance in the articles and systems as disclosed herein. For example, the particle size, the distribution of the particles in the heat-recoverable article, and the permeability of the particles must be considered in addition to providing an impedance-matched induction coil and power supply. As indicated herein, a preferred power supply for optimum self-regulation characteristics is one that is a constant current power supply, but other types of power supplies can be used in different embodiments of this invention depending on the particular uses and results desired for the systems of this invention. The factors involved in load matching and power supply/coil characteristics are similar to and much the same as in the systems in which ferromagnetic particles are heated by direct application of electric current. For example see, U.S. Pat. No. 4,256,945 of Carter et al., U.S. Pat. No. 4,695,713 of Krumme, and related patents.

The advent of this invention resulted from efforts to discover an inexpensive, self-heating, auto-regulating heat-recoverable sleeve for use as a connector and a method for its manufacture and use without the need for direct connection to a power source. It was found that heat-shrinkable tubing slipped over an inner sleeve incorporating particles which, when subjected to an alternating magnetic field, heat to the Curie temperature of the particles by induction heating generate sufficient heat to cause both sleeves to resume to its original, unexpanded configuration. More precisely, when the outer sleeve (driver sleeve) recovers, it forces the inner sleeve (heat-shrinkable or not) to compress against the member it surrounds. This embodiment of the present invention is but one illustration of the wide range of embodiments within the scope of the present invention.

For the purpose of experimentation, heat-generating particles were deposited on the outer surface of the inner sleeve which was then covered with an additional sleeve. Formation of the particle-containing, heat-recoverable sleeve can also be achieved by co-extrusion of the particles onto or within the sleeve.

In order to further describe and illustrate the present invention, reference is now made to the drawing attached hereto.

FIG. 1 depicts connector 10 made in accordance with this invention. Connector 10 includes outer tube 12 which is heat-shrinkable, magnetic particle coating 14, and inner tube 16 which is also heat-shrinkable. Disposed within inner tube 16 is solder preform 18. Outer tube 12, referred to herein as driver tube 12, is composed of any conventional heat-shrinkable material.

Generally, such heat-shrinkable materials are composed of cross-linked polymers which have been rendered dimensionally heat-unstable during processing where, upon exposure to heat at or in excess of the crystalline transition temperature, the material recovers to its dimensionally heat-stable configuration. As is readily appreciated by those of ordinary skill in the art, there are many such materials, polymeric or not, exhibiting a large range of crystalline transition temperatures which are selected to suit a particular purpose based upon the physical characteristics of both the material and its crystalline temperature.

Magnetic particle coating 14 is composed of any appropriate binding material such as a wax, silicone cement, or simply a layer of finely-ground powder deposited on driver tube 12 by conventional mechanical or vapor deposition means. The powder, for example, can be Fair-Rite (trademark) No. 73 (which is available from Fair-Rite Products Corp., Wallkill, N.Y.) which when ground into a fine powder, exhibits the characteristics desirable for practice of this invention. Fair-Rite No. 73, itself, possesses properties including $\mu_i$ of 2500, $\mu$ max of 4000, $B_s$ gauss at 13 oer of 4000, a Curie temperature of 160° C., volume resistivity in ohm-centimeter of 100, and $H_c$ in oer of 0.18. Both of these materials exhibit a sufficiently lossy nature at 13.56 megahertz and far below that frequency to provide the necessary induction heating effects at relatively low frequencies.

It has also been found that metal plating the ferrite particles with a highly electrically-resistive metal enhances heat generation due to eddy currents established in the resistive plating. It is also possible to coat the particles with a conductive material, but if a less resistive material (metal, conductive polymer, etc.) is employed, then caution must be exercised to avoid formation of an electrically conductive pathway between the particles.

Moving now to the composition and structure of inner tube 16, it may be selected from any material as long as it adequately serves to positionally stabilize magnetic particle coating 14 relative to driver tube 12. Hence, inner tube 16 need not necessarily be formed from a heat-recoverable material, but, if not, it must be easily deformable so as not to impede the heat-recovery of driver tube 12 as it shrinks inwardly. However, as a practical matter, inner tube 16 is preferably composed of the same material as driver tube 12 and has an outer diameter corresponding to the inner diameter of driver tube 12.

Where desirable, connector 10 can incorporate solder preform 18 to more securely join wires, wire terminals, or the like contained within the tube. The composition of solder preform 18 is of any conventional alloy as long as it is compatible with the foregoing and thus has a melting temperature below that of the Curie temperature of the particles contained in magnetic particle coating 14.

Preferably, solder preform 18 would have a melting temperature tailored to be less than the Curie temperature of the particles and preferably in the same range as the crystalline transition temperature of driver tube 12 whereupon application of the alternating magnetic field will inductively heat the ferromagnetic particles and cause solder preform 18 to soften and melt as tubes 16 and 12 contract. The melted solder is then pressed around wires or other substrates present inside the connector, then the solder hardens once the application of the alternating magnetic field is terminated, thereby forming a strong, secure connection.

FIG. 2 illustrates tube 20 in sheet form. Like driver tube 12 in FIG. 1, sheet 22 is composed of a heat-shrinkable material. Embedded layer 24, the equivalent of magnetic particle coating 14, comprises the non-conductive magnetic particles either alone or combined with a bonding agent. The sheet form, in contrast to the tube form, is advantageous in certain applications which do not permit the use of a tube. The sheet can be wrapped around a subject member (spliced wires, etc.) and exposed to an appropriate magnetic field to induce heating and heat shrinking.

Referring to the equipment employed in the experimental phase, a constant current power supply RFG30 available from Metcal, Inc., Menlo Park, Calif., having an adjustable current power output control was selected. This power supply was modified to have a mannual adjustment of the level of the current output, but once set it operated at the selected constant current power setting. The power supply was attached to an inductance coil through a Transmatch III matching network available from MFJ Enterprises, Starkville, Miss. The principal characteristics of the coil included 13.5 turns of 0.035 inch (0.89 millimeter) diameter HML wire, a length of 0.55 inch (13.97 millimeters), and an inner diameter of 0.215 inch (5.46 millimeters). The matching network was tuned to provide an initial maximum transmission of 5 watts to the induction coil prior to introduction of connector 10. Once inserted, connector 10 caused the power to rise to approximately 13 watts and to auto-regulate down to 8 watts. Thus, a net change from 8 to 3 watts was exhibited.

Given the foregoing arrangement, a variety of materials was tested. Those materials, particles, power requirements, and recovery time (the time required to induce substantially complete recovery of the dimensionally heat-unstable materials to a dimensionally heat-stable configuration), are provided in Table I.

TABLE I

| | |
|---|---|
| Heat-shrinkable tube composition (inner and outer) | Kynar |
| Tube outer diameter | 0.210 inch (5.33 mm) |
| Tube wall thickness | 0.007 inch (0.18 mm) |
| Tube length | 0.511 inch (12.99 mm) |
| Heating particles | Fair-Rite 73 powder |
| Initial power (net) | 8 watts |
| Regulated power (net) | 3 watts |
| Recovery time | 10–15 sec. |

Figure 3:
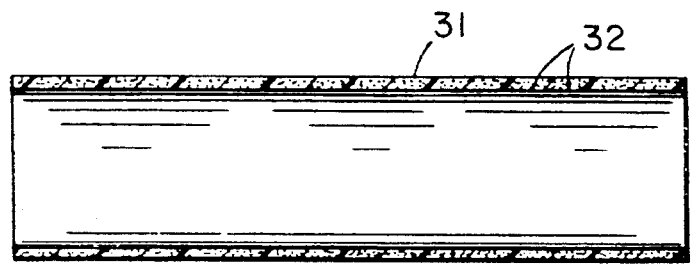
FIG. 3 illustrates particles dispersed throughout a sleeve made by co-extrusion.
Figure 4:
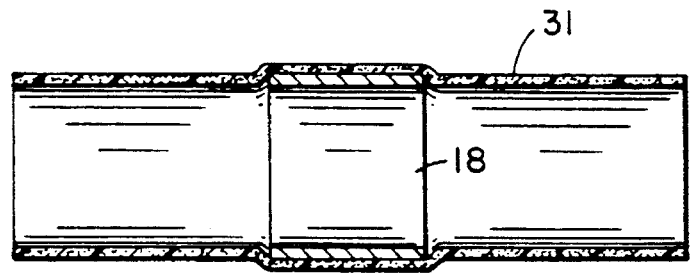
FIG. 4 illustrates particles dispersed throughout a sleeve which has a solder preform.
Figure 5:
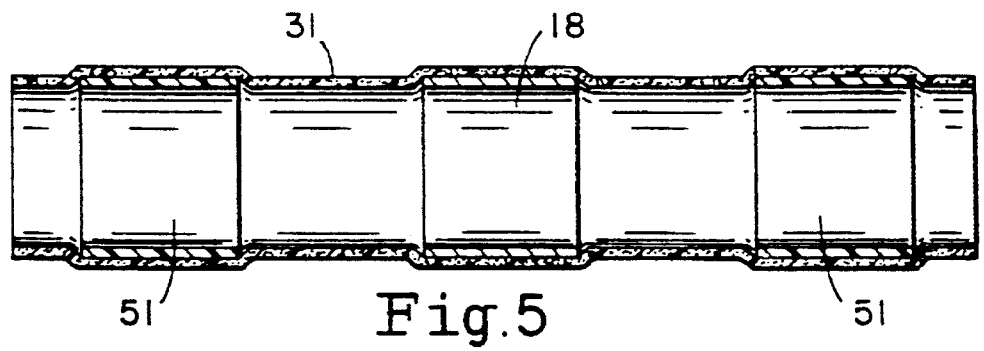
FIG. 5 illustrates particles dispersed throughout a sleeve which has meltable thermoplastic inserts and a solder preform.

FIGS. 3–5 illustrate various arrangements of materials in a plastic tube such as the inner tube 16 of FIG. 1. In FIG. 3, plastic tube 31 is of an appropriate thermoplastic with particles 32 dispersed evenly throughout. Without solder or other inserts, the tube can be used merely as a heat recoverable sleeve. FIG. 4 illustrates the same tube as FIG. 3 with solder preform 18 disposed within plastic tube 31. In FIG. 1, the particles are dispersed on surface 14 of the plastic tube 16 and not within the plastic. FIG. 5 illustrates meltable plastic inserts 51 within the plastic tube 31 of FIG. 3 together with solder preform 18 whereby during a single heating operation, solder preform 18 is melted to join the members, and meltable plastic inserts 51 flow and provide a waterproof seal. Such inserts can be thermoplastic, fusible, thermosetting, self sealing, or other useful inserts.

Figure 6:
FIG. 6 illustrates a cross-sectional view of a double sleeve arrangement.

Referring to FIG. 6, an inner tube 25 has ferrite particles either incorporated therein or coated on its outer surface and an outer tube 27 of heat-shrinkable material. The inner tube 25 may also, but not necessarily, be of heat-shrinkable material. Upon heating, the outer tube 27 shrinks and collapses the structure about a substrate or member to be encased.

Figure 7:
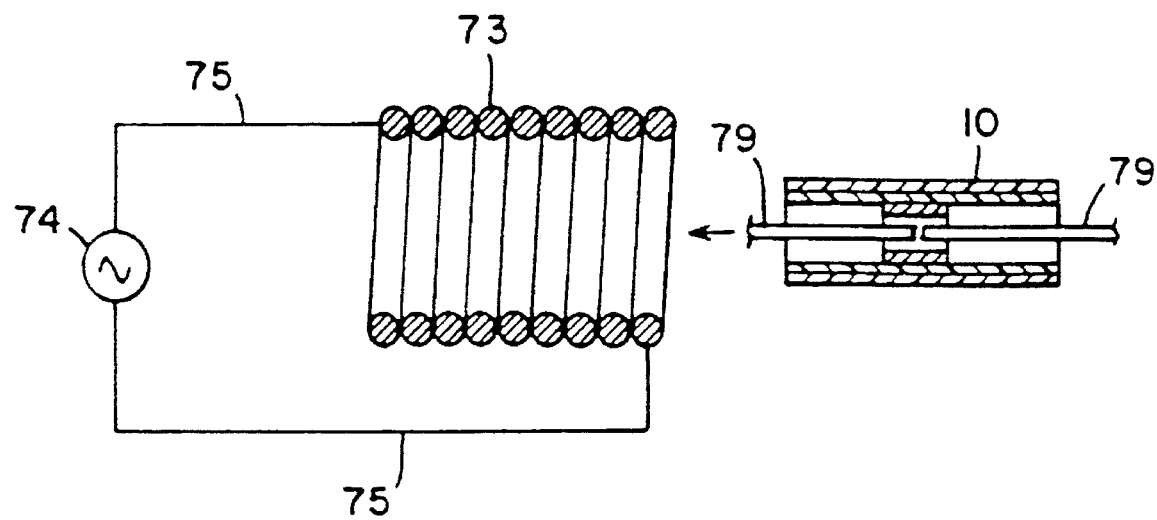
FIGS. 7 and 8 illustrate systems and assemblies according to this invention.

Referring to FIG. 7, heat-recoverable connector 10 of FIG. 1 is adapted for recovering onto and connecting wires 79. Induction coil 73 (shown in section view) is connected to alternating current power supply 74 by leads 75. Preferably, the power supply is a constant current power supply, as defined and illustrated in U.S. Pat. No. 4,789,767 to Doljack, and U.S. application Ser. No. 169,027, filed Mar. 3, 1988, now abandoned, both of which are incorporated herein by reference. The induction coil, which is adapted for receiving connector 10, generates an alternating magnetic field in the area of connector 10 causing particles in layer 14 to heat connector 10, thereby recovering connector 10 onto substrates 79.

Figure 8:
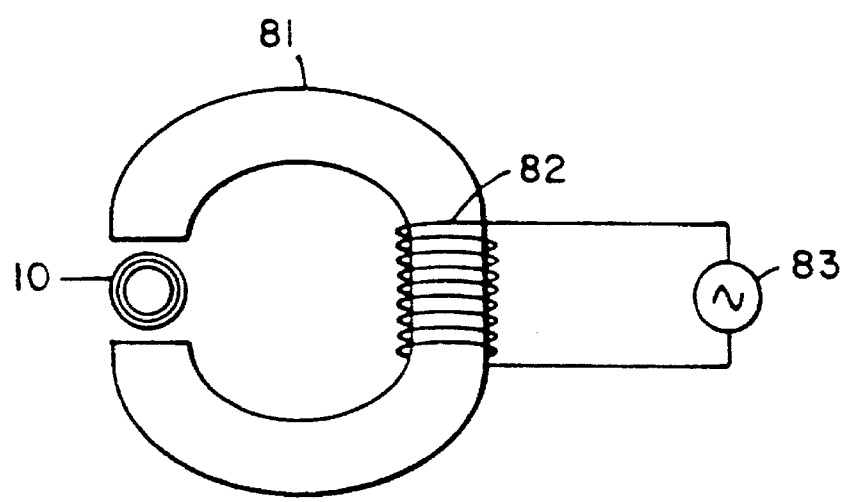

FIG. 8 illustrates another embodiment for generating the alternating magnetic field for use in this invention. Split torrid core 81 generates a magnetic field in the area adapted for receiving connector 10. Coil 82 is connected to alternating current power supply 83 to produce the desired alternating magnetic field.

As will be recognized by those skilled in the art from the above general description of this invention and the above description of preferred embodiments, the present invention provides a number of advantages over the prior art devices and methods for heating and recovering heat-recoverable articles. For example, the present invention is very efficient in heat and energy usage because the heat and energy is supplied directly to the heat-recoverable material and can be arranged so the heat is supplied internally in the heat-recoverable article, thus eliminating any exterior waste of heat and energy. Moreover, the present invention enables one to use embodiments that are suitable for recovery of heat-recoverable articles in environments not suitable for recovery of articles by external heat sources such as a flame. Among those environments are underground installations such as for telephone cables and power cables where the use of an open flame or heat sources which can possibly ignite combustible gasses are not permitted. Another environment in which the present invention enables the construction of embodiments for recovery of heat-recoverable articles is underwater applications. Other embodiments for various environments will be apparent to one skilled in the art following the teachings of this invention.

It will also be apparent to one skilled in the art that various prior art elements may be used in combination with the present invention. For example, thermochromic indicators and coatings may be used on the heat-recoverable articles of the present invention to serve as an indicator and quality control device to assure that the operator retains the heat-recoverable article in the alternating magnetic field for a sufficient period of time to produce the desired temperature and heating. For example, on a continuous production line, the thermochromic indicator can be used to indicate that the heat-recoverable article has moved through the magnetic field at the desired rate and that the desired Curie temperature was, in fact, reached and/or that the desired degree of heating has, in fact, occurred.

Indication of sufficient heating is also inherent in the system of this invention by monitoring the power supplied to the heat-recoverable article by the system. When the article is below the Curie temperature, the system will deliver maximum power to the article. Once the article is substantially at the Curie temperature, its coupled resistance will decrease and the power delivered to it will also decrease to a minimum level. By monitoring the powere level one can easily determine when the desired temperature has been reached and can then control the length of time that the system maintains the article at that temperature by its auto-regulation capabilities.

Given the foregoing objects, description, and examples of the invention, many variations and modifications, both of the devices and methods, should now be readily apparent to the person of ordinary skill in the art. These variations and modifications are intended to fall within the scope and intent of this invention as defined by the following claims.

I claim:

1. A process for producing a self-heating, auto-regulating connector, comprising the steps of:

a) deforming a first dimensionally heat-stable sleeve to render the sleeve dimensionally heat-unstable at temperature T, b) coating the first sleeve with an electrically non-conductive layer of highly lossy, ferromagnetic particles having a Curie transition temperature greater than T, c) deforming a second dimensionally heat-stable sleeve to a dimensionally heat-unstable configuration at temperature T, d) positioning the second sleeve over the first sleeve so the coated particles are in contact with the second sleeve to form a composite sleeve, and e) exposing the combined sleeve to an alternating magnetic field causing the particles to heat to their Curie transition temperature which causes said first and second sleeves to substantially return to their dimensionally heat-stable configuration.

2. A process according to claim 1 further including the step of plating the particles with a highly resistive metal to allow eddy currents to be induced in the plated layer.

3. A process according to claim 1 further including the steps of forming the sleeves wherein the second sleeve surrounds the first sleeve as a tube and inserting a solder preform having a melting temperature below the Curie temperature within the first sleeve.

* * * * *